United States Patent [19]

Chung

[11] Patent Number: 4,488,283
[45] Date of Patent: Dec. 11, 1984

[54] EPOXY RESIN

[75] Inventor: Kwong T. Chung, Hopewell Township, Mercer County, N.J.

[73] Assignee: RCA Corporation, New York, N.Y.

[21] Appl. No.: 545,736

[22] Filed: Oct. 26, 1983

[51] Int. Cl.³ .............................................. G11B 3/44
[52] U.S. Cl. .................................... 369/135; 369/132
[58] Field of Search ............... 523/457, 400; 528/341; 369/132, 135, 137

[56] References Cited

U.S. PATENT DOCUMENTS 4,035,590  7/1977  Halter ......................... 179/100.41 P

OTHER PUBLICATIONS

Ciba-Geigy, "Araldite MY 720," Resins Dept., Ciba-Geigy Corporation, Ardsley, New York 10502.
EPON Resin Structural Reference Manual, Shell Chemical Company.
Lee et al.; Handbook of Epoxy Resins; McGraw-Hill Book Co.; 1967; pp. 12-9, 12-10, 14-30, Sci. Lib.

Primary Examiner—Lewis T. Jacobs
Attorney, Agent, or Firm—Birgit E. Morris; Edward J. Sites

[57] ABSTRACT

An epoxy composition derived from tetraglycidated methylene dianiline cured with a methylated maleic acid adduct of phthalic anhydride has a high glass-transition temperature and a low curing temperature and when cured has very high bond strength. This epoxy can be used to bond a diamond cutterhead stylus to a piezoelectric element.

5 Claims, 1 Drawing Figure

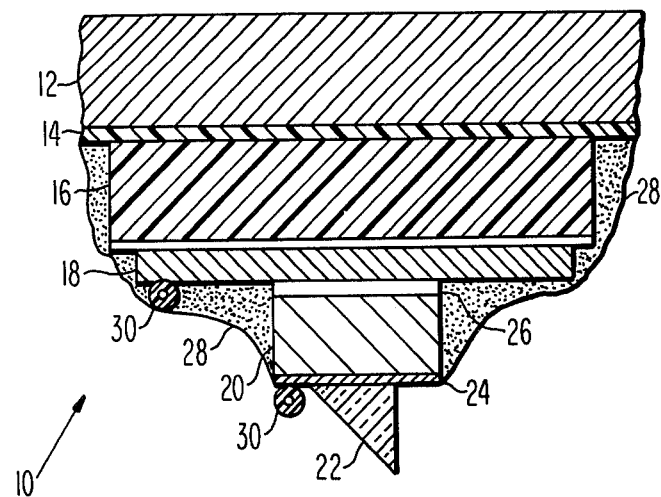

EPOXY RESIN

This invention relates to an epoxy resin having a high glass-transition temperature and a low curing temperature. This epoxy is useful in adhering a miniature ceramic piezoelectric element to a diamond stylus in an cutterhead assembly for recording high-density information discs.

BACKGROUND OF THE INVENTION

In the manufacture of high-density information discs, a diamond cutterhead is used to cut a surface relief pattern including information bits and tracking aids into a metallic substrate. The cutterhead assembly includes a diamond stylus bonded to a piezoelectric element, a pedestal member and, in turn, a mounting bracket.

As disclosed in U.S. Pat. No. 4,035,590 to Halter, herein incorporated by reference, the diamond stylus is bonded to the piezolectric element by means of an epoxy resin. At the present time the metallic substrate is cut at one-half real time; that is, it takes two hours to cut information into the substrate that represents one hour of playback time. As is readily apparent, if the substrate could be cut at real time rates, a substantial savings in time and costs would be realized. However, at such high recording speeds the temperatures generated in the piezoelectric transducer operating at real time frequencies up to 5 Megahertz rise rapidly to about 150° C., as contrasted to operating temperatures of about 60° C. at one-half time rates. All conventional commercially available high-temperature epoxy bonding materials tested resulted in failures between the diamond-piezoelectric element interface when tested at 150° C.

The requirements for a bonding material that bonds the diamond stylus to a ceramic piezoelectric element at temperatures of about 150° C. are most stringent. The bond must withstand the stress of curing high-density information patterns into metal, e.g., copper, for at least one hour of playback time. The bonding material must have a high heat deflection temperature (over 150° C.) and high glass-transition temperature in order to provide adequate shear strength, tensile strength and lap shear strength at cutting temperatures. It must also be able to be cured at temperatures of 150° C. or less to prevent damage to the piezoelectric element and in a layer of very uniform thickness across the diamond base to prevent undue stress and component bond failures at the piezoelectric-bonding material interface. The dimensions of the diamond stylus base are only about 150×150 microns; therefore, any non-uniformity in the thickness of the bond line results in high concentrations of stress in the layer, causing bonding failures. In addition, the bond strength is desirably over 3,000 psi at elevated temperatures, preferably about 5,000 psi, in order to give a useful life to the cutterhead assembly which must cut millions of information bits for an hour or more of playback time.

SUMMARY OF THE INVENTION

I have discovered an epoxy composition having a high glass-transition temperature of over 150° C. that can be cured at temperatures of 150° C. or less and that can form a uniform thickness bond between a piezoelectric element and a diamond stylus that makes an improved cutterhead assembly for the manufacture of high-density information discs.

BRIEF DESCRIPTION OF THE DRAWING

The FIGURE is a cross-sectional view of a cutterhead assembly suitable for use in the invention.

DETAILED DESCRIPTION OF THE INVENTION

The improved epoxy composition that can operate at high temperatures of about 150° C. or higher is made from a tetraglycidyl ether compound, tetraglycidated methylene dianiline having the formula

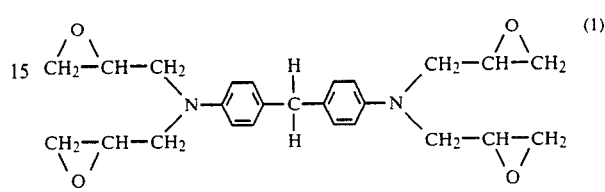

This material contains four epoxy groups per monomer and has a viscosity of 20,000 centipoises at 50° C. It is cured using a methylated maleic acid adduct of phthalic anhydride as the curing agent. This compound has the formula

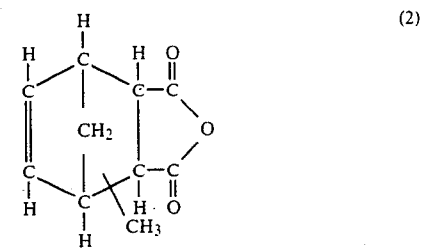

It is employed in an amount of from about 90 to 110 parts per 100 parts of the glycidyl ether. This compound has a viscosity of 175 to 275 centipoises at 25° C.

In addition from 0 to about 5 parts by weight of benzyl dimethyl amine accelerator, based on 100 parts of the tetraglycidal ether compound, can be added to improve the speed and degree of curing.

Lastly, from 0 to 100 parts by weight, based on the epoxy precursor, of a finely divided filler having uniformly sized particles and having a low thermal expansion coefficient can also be added. Suitable fillers include alumina or silica particles having a uniform particle size of from about 0.05 to about 1 micron.

It has also been found that the order and conditions of mixing of these ingredients is important and has an effect on the strength of the bond, particularly at elevated temperatures.

The curing agent is stirred into the viscous epoxy precursor until the mixture becomes free-flowing. The mixture is then warmed to about 30°–100° C. to ensure good molecular mixing of the ingredients, but at a temperature insufficient to cause any large-scale polymerization or curing. This procedure markedly improves the ultimate bond strength of the cured epoxy. After stirring again, the mixture is allowed to cool to room temperature. This allows maximum uniform mixing of the curing agent and the viscous epoxy precursor. Next the accelerator is added, if used, while mixing vigorously to ensure uniformity. Finally, the filler is mixed in with slow stirring until a smooth viscous paste is obtained. To ensure complete wetting of the filler, the mixture is then placed under vacuum to degas the mixture.

The preferred curing procedure is to allow the paste to set up at about 100° C. for a couple of hours and then cure at a temperature of about 150° C. until fully cured, e.g., about one day, when it is allowed to cool to room temperature.

The use of the above epoxy in a cutterhead assembly will be further explained with reference to the Drawing. The FIGURE illustrates an electro-mechanical cuttherhead assembly 10 in which the above-described epoxy resin is useful. The cutterhead assembly 10 includes a mounting support 12 bonded by means of an adhesive layer 14 to an isolation pad 16. A conductive pedestal 18 supports a piezoelectric element 20 having a diamond stylus 22 mounted thereon. The piezoelectric element 20, which can be a lead zirconium titanate ceramic, for example, is adhered to the stylus 22 by means of the nonconductive epoxy composition of the invention 24. A second, conductive, epoxy composition layer 26 adheres the piezoelectric element 20 to the conductive pedestal 18, which can be a plate of steel or tungsten. The isolation pad 16 is made of a material that is electrically insulating, heat-conducting and mechanically isolating and can be a silicon-based or epoxy-based composition. A suitable silicone-based composition is commercially available under the tradename Silpad from the Bergquist Company. The isolation pad 16 is adhered to the steel mounting support 12 by an epoxy composition. A damping epoxy layer 28 surrounds the piezoelectric element 20, the steel pedestal 18 and the isolation pad 16. Electrical leads 30 energize the cutterhead and complete the assembly.

The invention will be further described in the following Example, but the invention is not meant to be limited to the details therein. In the Example all parts and percentages are by weight unless otherwise noted.

EXAMPLE

One hundred parts of methylated maleic acid adduct of phthalic anhydride was mixed with 100 parts of tetraglycidated methylene dianiline with a spatula. The color of the mixture changed from straw to a greenish brown. The mixture was then placed in an oven at 50° C. for 15 minutes, mixed vigorously with a spatula and cooled to room temperature.

Four parts of benzyl dimethyl amine were added dropwise while mixing vigorously. The mixture became red brown in color.

Eighty parts of 0.3 micron particle size alumina powder was then added and mixed to a viscous paste.

The resultant mixture was placed in a vacuum chamber at about $10^{-5}$ torr and degassed for about 2 hours.

The resultant epoxy composition was applied to a group of diamond stylii bases about 150×150 microns in size and piezoelectric elements made of lead zirconium titanate electrolessly plated with about 0.5 micron of nickel. The assemblies were cured at 100° C. for 2 hours and at 150° C. for 24 hours and slowly cooled to room temperature.

The bond strength obtained was between 3,000 and up to 6,000 psi as measured while pushing the adhered diamond in the shear direction.

The glass-transition temperature of the cured resin was 200° C.

I claim:

1. In a cutterhead assembly comprising a diamond stylus bonded to a piezoelectric element, a pedestal and a mounting support, the improvement which comprises utilizing as a bonding material to bond the stylus to the piezoelectric element, a cured epoxy composition derived from tetraglycidated methylene dianiline cured with a methylated maleic acid adduct of phthalic anhydride.

2. The assembly according to claim 1 wherein benzyl dimethyl amine accelerator is added prior to curing.

3. The assembly according to claim 1 wherein from 0 to 100 parts of a finely divided, uniform particle size filler particles are added per 100 parts of epoxy precursor.

4. The assembly according to claim 3 wherein the filler is aluminum oxide.

5. The assembly according to claim 1 wherein from 90 to 110 parts by weight of the curing agent per 100 parts of the epoxy component are employed.

* * * * *